Dec. 17, 1929. W. N. MARBLE 1,739,601
GRAPPLE
Filed July 16, 1928 2 Sheets-Sheet 1
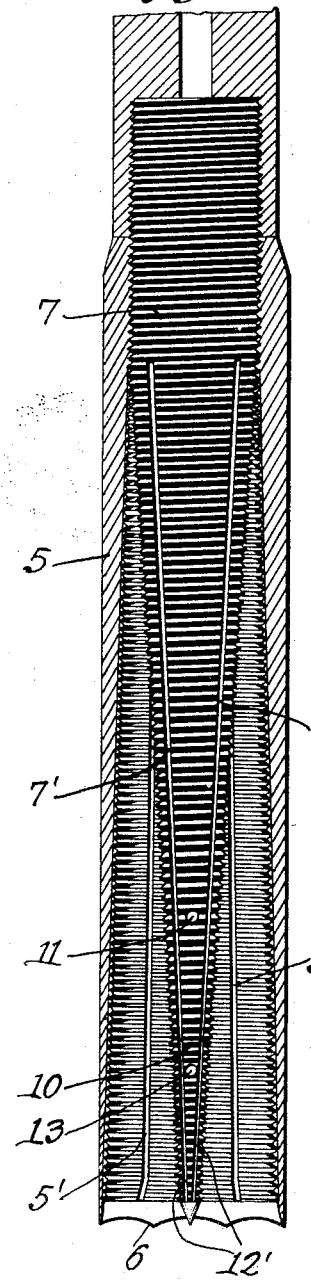
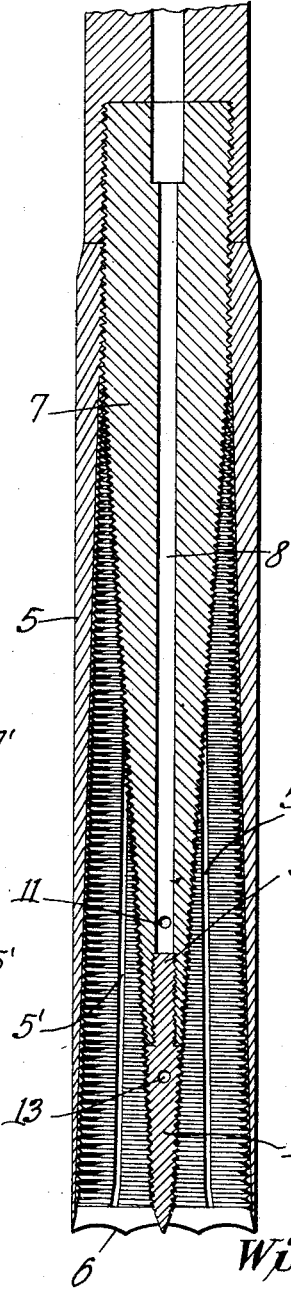
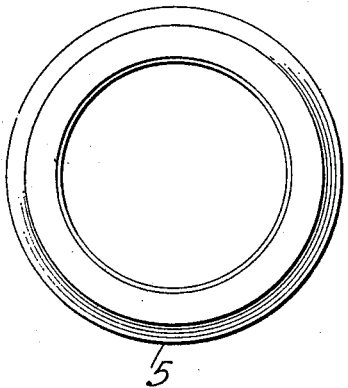
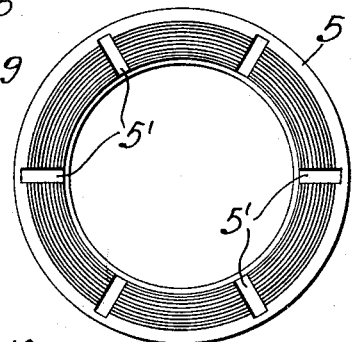
Wilbur N. Marble
Inventor
By C. A. Snow & Co.
Attorneys Dec. 17, 1929.  W. N. MARBLE  1,739,601
GRAPPLE
Filed July 16, 1928   2 Sheets-Sheet 2
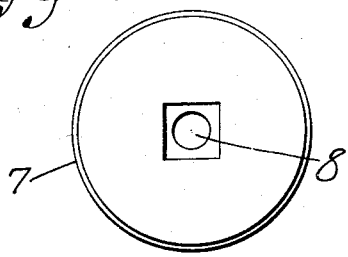
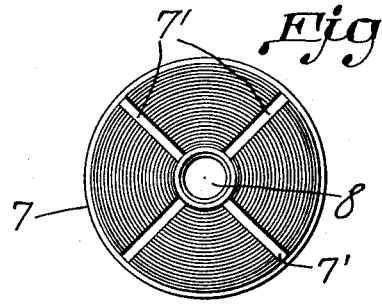
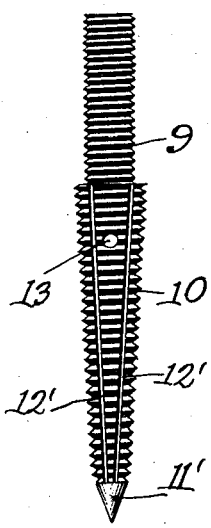
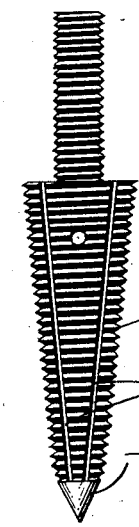
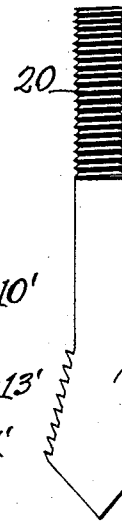
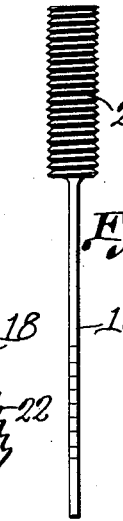
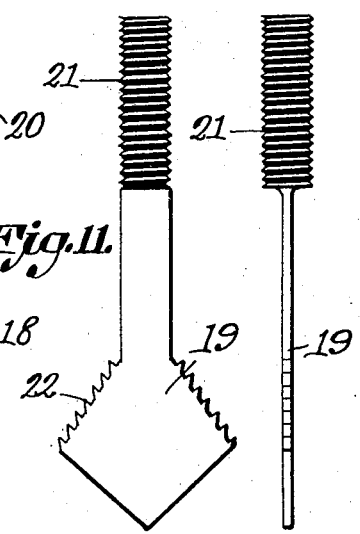
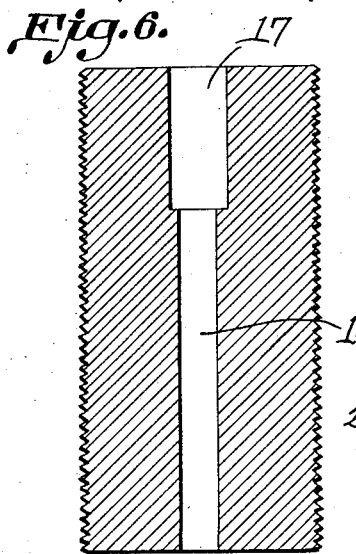
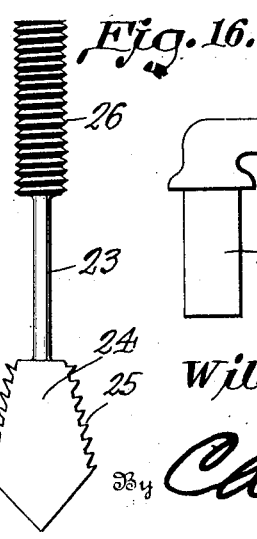
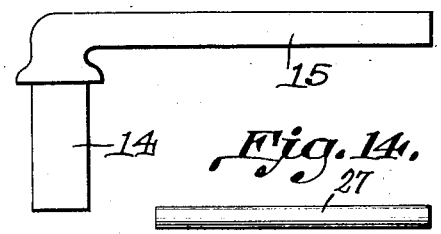
Wilbur N. Marble
Inventor Patented Dec. 17, 1929

1,739,601

UNITED STATES PATENT OFFICE

WILBUR NOAH MARBLE, OF SHREVEPORT, LOUISIANA, ASSIGNOR OF ONE-HALF TO BERT C. OLDHAM, OF SHREVEPORT, LOUISIANA

GRAPPLE

Application filed July 16, 1928. Serial No. 293,225.

This invention relates to a fishing tool especially designed for use in fishing for articles such as pipes, rods or other articles accidentally dropped into a well, during the drilling of the well.

The primary object of the invention is to provide a tool of this character in the form of a die which when lowered into the well casing may be rotated to cut threads in the article to be removed by the tool so that the tool may be connected with the article and removed from the well casing with the article.

Another object of the invention is to provide a fishing tool of this character having interchangeable bits for various purposes.

With the foregoing and other objects in view which will appear as the description proceeds the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view through a fishing tool constructed in accordance with the invention, the inner removable member being shown in elevation.

Figure 2 is a longitudinal sectional view through the tool.

Figure 3 is a plan view of one end of the lower section of the tool.

Figure 4 is a bottom view of the lower section of the tool.

Figure 5 is an end view of a connecting member used for connecting adjacent sections of the tool.

Figure 6 is a longitudinal sectional view through the connecting member.

Figure 7 is a bottom view of the lower section, the pointed member forming a part of the inner tapered member, being removed.

Figure 8 is an elevational view of the removable end member.

Figure 9 is a side elevational view of a modified form of end member.

Figure 10 is a side elevational view of one of the removable end members.

Figure 11 is a view of one of the removable end members, taken at right angles to Figure 10.

Figure 12 is an elevational view of a removable end member showing a modified form of end member.

Figure 13 is an elevational view taken at right angles to Figure 12.

Figure 14 is an elevational view of a rod used in rotating the removable pointed end members.

Figure 15 is an elevational view of a wrench employed for securing the sections of the tool.

Figure 16 is a further modified form of end member.

Referring to the drawings in detail the device embodies a plurality of sections removably connected, so that they may be dropped into a well casing to accomplish the purpose of the invention.

The reference character 5 designates the lowermost tubular section of the device, which is shown as having an inclined inner surface threaded throughout its length, as clearly shown by Figure 1 of the drawings. The section 5 is formed with grooves 5' defining a die so that the section 5 may cut threads in the article in the well, to be removed.

At the lower end of the section 5 are cutting blades or edges 6 designed to cut the soil or cut into the object to be removed by forcing the object against the wall of the casing.

Secured within the section 5, is an inner tapered section 7 which is also provided with cutting threads so that when the tool is dropped into a well casing, the article to be removed will find its way between the threads of the section 5 and the threads of the section 7 and a slight rotation of the device will cause the threads to cut into the article connecting the tool to the article so that when the tool is removed, the article will be drawn from the well with the tool.

As shown by Figure 2 of the drawings, the inner tapered section 7 is formed with a bore 8 disposed throughout the length thereof, the lower end of the bore being formed with threads to accommodate the threaded extension 9 of the removable tool point 10. An opening indicated at 11 is formed in the inner section 7 and communicates with the bore 8 to allow water to be pumped downwardly through the bore 8 to loosen an object held within the well. This opening may also be used to pump water from the well. Grooves 7' are formed in the member 7 and define cutting edges to cause the threads of the member 7 to cut into the article to be removed.

An opening 13 is formed in the removable pointed member 10 and is designed to receive a rod so that rotary movement may be imparted to the point or member 10 to position it. The removable point as shown by Figure 9 is substantially the same as that shown by Figure 8, except that the body portion 10' thereof is larger and is to be used when smaller objects are to be removed. These members 10 and 11' are formed with tapered extremities 11' to guide them to one side of the article to be removed.

The upper end of the bore 8 is square to receive the end 14 of the tool 15 so that the section may be readily rotated and secured. The section shown by Figure 6 is also formed with a bore 16 having a square upper end 17 to receive the tool so that the connecting sections may be readily positioned in a manner as described. In the form of the invention as illustrated by Figures 10 and 12, the removable end members are formed with flat heads 18 and 19 respectively, there being provided threaded end portions 20 and 21 so that they may be secured within the threaded extremities of the inner member 7.

The head 19 is slightly larger than the head 18 and the upper edges thereof are provided with teeth 22 so that they will bite into articles to be removed from the well casing to connect the tool to the article so that when the tool is removed, the article will be drawn from the well, with the tool.

A still further modified form of removable end member is shown by Figure 16 and includes a head 24 pointed at its free end, the head being formed with teeth 25. This end member embodies a shank 23 which is in the form of a rod having an enlarged threaded upper end 26. The reference character 27 indicates a bar which may be inserted in an opening of a removable end member to rotate the end member for positioning it.

In the use of the device a suitable pointed member is secured within the inner section and the fishing tool is dropped into the well casing. It is obvious that as the article to be removed is wedged between the sections 5 and 7 and the tool rotated, threads will be cut on the article which will cooperate with the threads of the tool securing the article to the tool so that it may be removed from the well.

Owing to the tapered construction of the device it will be seen that the device may be used as a tool for removing articles of various sizes and shapes. Should the article to be removed be exceptionally large, the section 7 may be removed and the section 5 dropped into the well over the article which will become wedged between the inclined surfaces of the threads and the tool rotated to cause threads to be cut in the article so that upon elevating the tool, the threads of the tool being in engagement with the newly cut threads of the article, may be elevated and the article removed.

It might be further stated that the end members as shown by Figures 8 and 9 of the drawings, are provided with die grooves, the die grooves of the member shown by Figure 8 being indicated by reference character 12', while the reference character 13' designates the die groove of the structure shown by Figure 9.

I claim:

1. A fishing tool including a lower hollow section, an inner tapered section fitted within the hollow section, said sections having cooperating threads to cut threads into an article engaged by the tool, and a threaded pointed member removably held within the lower end of the inner section.

2. A fishing tool including a lower hollow section having a tapered inner surface formed with threads and having a lower cutting edge, a removable tapered inner section fitted within the hollow section and having threads to cooperate with the threads of the lower section to cause an article to be wedged between the inner section and lower section, and a removable pointed member secured to the inner section.

3. A fishing tool including a lower hollow section having internal threads and having a cutting end said lower section having a plurality of longitudinal grooves formed therein, an inner tapered member fitted within the lower section, said inner tapered member having a longitudinal bore and having lateral openings communicating with the bore to permit fluid to be forced laterally from the tool.

4. In a fishing tool for fishing articles from well casings, including a lower section having a cutting edge, a tapered inner section removably held within the lower section, said inner section having a longitudinal bore and having grooves formed exteriorly thereof, and a removable pointed member secured within the lower end of the inner section.

5. In a fishing tool, a lower section having a tapered inner surface formed with threads throughout its length, an inner removable section tapered towards the lower end and formed with external threads, the threads of the inner section and lower section adapted to cooperate to grip an article, said inner section having slots and having a longitudinal bore and having openings communicating with the bore to allow fluid to pass therethrough.

In testimony that I claim the foregoing as my own, I have hereto affixed my signature.

WILBUR NOAH MARBLE.